United States Patent Office 3,734,980
Patented May 22, 1973

3,734,980
PHOSPHORUS CONTAINING AMIDINES
Ferenc M. Pallos, Pleasant Hill, Calif., assignor to Stauffer Chemical Company, New York, N.Y.
No Drawing. Filed Dec. 15, 1969, Ser. No. 885,263
Int. Cl. A01n 9/36; C07f 9/24
U.S. Cl. 260—944          12 Claims

ABSTRACT OF THE DISCLOSURE

Compounds of the formula:

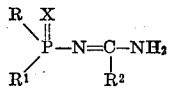

in which R is lower alkyl or lower alkoxy; $R^1$ is lower alkoxy or lower alkylthio; $R^2$ is hydrogen, lower alkyl, phenyl; mono or di-substituted phenyl; and X is oxygen when $R^1$ is lower alkylthio and sulfur when $R^1$ is lower alkoxy as insecticides and acaricides, and a process for preparing the compounds above having X be oxygen.

---

This invention relates to the use of certain novel phosphorus containing amidine compounds as insecticides and acaricides and to a process for preparing the phosphorus containing amidines.

The compounds of the present invention that are useful as insecticides and acaricides are those having the formula:

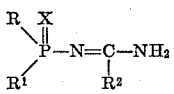

in which R is lower alkyl having 1 to 4 carbon atoms, preferably 1 to 2 carbon atoms, or lower alkoxy having 1 to 4 carbon atoms, preferably 1 to 2 carbon atoms; $R^1$ is lower alkoxy having 1 to 4 carbon atoms, preferably 1 to 2 carbon atoms, or lower alkylthio having 1 to 4 carbon atoms, preferably 1 to 2 carbon atoms; $R^2$ is hydrogen, lower alkyl having 1 to 6 carbon atoms, preferably 1 to 3 carbon atoms; phenyl; mono or di-substituted phenyl in which the substituents are lower alkyl having 1 to 4 carbon atoms, halogen or nitro; and X is oxygen when $R^1$ is lower alkylthio and sulfur when $R^1$ is lower alkoxy.

Representative compounds are as follows:

O,O-dimethyl thionophosphoryl butyramidine
O,O-dibutyl thionophosphoryl butyramidine
O,S-dimethyl phosphoryl butyramidine
O,S-dibutyl phosphoryl butyramidine
O-methyl, methyl thionophosphonyl butyramidine
O-butyl, butyl thionophosphonyl butyramidine
O-methyl, methyl phosphonyl butyramidine
O-butyl, butyl phosphonyl butyramidine
O-methyl, O-butyl thionophosphoryl butyramidine
O-butyl, S-methyl phosphoryl butyramidine
O-methyl, butyl thionophosphonyl butyramidine
O-butyl, methyl phosphonyl butyramidine
O,S-dimethyl phosphoryl formamidine
O,S-dimethyl phosphoryl acetamidine
O,S-dimethyl phosphoryl heptamidine
O,S-dimethyl phosphoryl benzamidine
O,S-dimethyl phosphoryl chlorbenzamidine
O,S-dimethyl phosphoryl methylbenzamidine
O,S-dimethyl phosphoryl nitrobenzamidine Compounds having the formula:

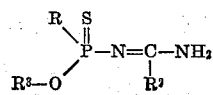

in which R and $R^2$ are as defined and $R^3$ is lower alkyl having 1 to 4 carbon atoms, preferably 1 to 2 carbon atoms, can be prepared by the following reaction:

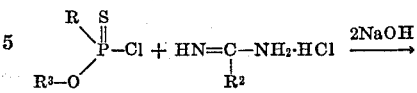

in which R, $R^2$, and $R^3$ are as stated.

Preferably about 2 moles sodium hydroxide or other suitable acid acceptor is added with heavy stirring to an aqueous solution of equal mole amounts of the reactants. The reaction is exothermic and heating is not normally necessary, but can be used. After the reaction is complete the reaction product, normally an oil, can be recovered by conventional extraction techniques.

The process of this invention for preparing compounds of the formula:

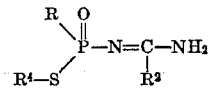

in which R is lower alkyl having 1 to 4 carbon atoms, preferably 1 to 2 carbon atoms, or lower alkoxy having 1 to 4 carbon atoms, preferably 1 to 2 carbon atoms; $R^2$ is hydrogen, lower alkyl, having 1 to 6 carbon atoms, preferably 1 to 3 carbon atoms; phenyl, mono or di-substituted phenyl in which the substituents are lower alkyl having 1 to 4 carbon atoms, halogen or nitro; and $R^4$ is lower alkyl having 1 to 4 carbon atoms by reacting a compound of the formula:

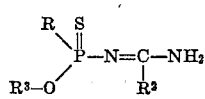

in which R and $R^2$ are as defined and $R^3$ is lower alkyl having 1 to 4 carbon atoms with a compound of the formula:

$R^4I$ in which $R^4$ is as defined. The process of this invention can be depicted by the following equation:

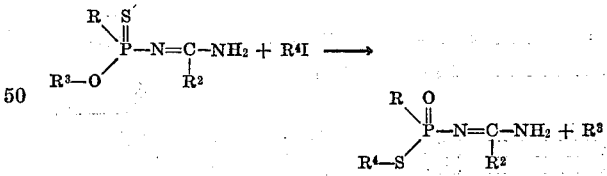

in which R, $R^2$, $R^3$, and $R^4$ are as stated.

No special reaction conditions are necessary for the process of this invention. It proceeds at room temperature, however, heating to reflux accelerates the reaction. Preferably, a solvent is used but is not necessary. The iodide reactant can be used as the solvent if desired, if used in large enough excess. Preferably, at least an equal mole amount of the iodide reactant should be used for a complete reaction.

Preparation of the compounds of this invention and the process of this invention is illustrated by the following examples.

EXAMPLE I

O,O-dimethyl thionophosphoryl butyramidine

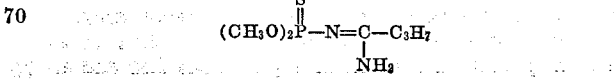

24.5 gr. (0.2 mole) butyramidine·HCl is dissolved in 150 ml. water. 32.0 gr. (0.2 mole) O,O-dimethylphosphoro chlorido-thioate is added and 16.0 gr. (0.4 mole) NaOH in 80 ml. H$_2$O is dropped in under heavy stirring. The reaction is slightly exothermic and the temperature goes up to 39° C. Stirring is continued for one hour. The reaction product is extracted with ether four times, ether dried over MgSO$_4$, filtered, and stripped. The reaction product is confirmed to be the above structure. Yield: 36.0 gr. colorless oil. $N_D^{30}$=1.5160.

EXAMPLE II

O,S-dimethyl phosphoryl butyramidine

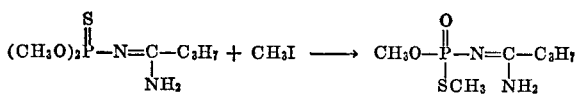

28.0 gr. of the reaction product of Example 1 and 100.0 ml. methyliodide are stirred and refluxed for 4 hours followed by cooling. The methyliodide is stripped yielding a white solid. This solid product is stirred with a small amount of cold ether for 10 minutes, filtered, yielding 22.0 gr. crystalline solid M.P. 91–94° C. which corresponds to the reaction product shown above.

The following is a table of certain selected compounds that are preparable according to the procedure described hereto. Compound numbers are assigned to each compound and are used throughout the remainder of the application.

TABLE I

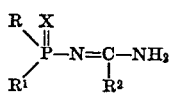

| Compound No. | R | R¹ | X | R² |
| --- | --- | --- | --- | --- |
| 1 | CH$_3$O— | CH$_3$S— | O | H |
| 2 | C$_2$H$_5$— | CH$_3$S— | O | H |
| 3 | CH$_3$O— | CH$_3$O— | S | H |
| 4 | CH$_3$O— | CH$_3$S— | O | CH$_3$— |
| 5 | CH$_3$O— | CH$_3$O— | S | ⟨phenyl⟩ |
| 6 | CH$_3$O— | CH$_3$S— | O | ⟨phenyl⟩ |
| 7 [1] | CH$_3$O— | CH$_3$O— | S | n-C$_3$H$_7$— |
| 8 | CH$_3$O— | CH$_3$O— | S | CH$_3$— |
| 9 | C$_2$H$_5$— | C$_2$H$_5$O— | S | ⟨phenyl⟩ |
| 10 [2] | CH$_3$O— | CH$_3$S— | O | n-C$_3$H$_7$— |
| 11 | C$_2$H$_5$— | CH$_3$S | O | ⟨phenyl⟩ |
| 12 | C$_2$H$_5$— | C$_2$H$_5$O— | S | n-C$_3$H$_7$— |
| 13 | C$_2$H$_5$— | C$_2$H$_5$O— | S | CH$_3$— |
| 14 | C$_2$H$_5$— | CH$_3$S— | O | CH$_3$— |
| 15 | C$_2$H$_5$— | CH$_3$S— | O | n-C$_3$H$_7$— |

[1] Prepared in Example I.
[2] Prepared in Example II.

INSECTICIDAL EVALUATION TESTS

The following insect species were used in evaluation tests for insecticidal activity:

(1) Housefly (HF)—*Musca domestica* (Linn.)
(2) Milkweed Bug (MWB)—*Oncopeltus fasciatus* (Dallas)
(3) Lygus Bug (LB)—*Lygus hesperus* (Knight)
(4) Bean Aphid (BA)—*Aphis fabae* (Scop.)

The Housefly (HF) was used in evaluation tests of selected compounds as insecticides by the following procedure. A Stock solution containing 100 μg./ml. of the toxicant in an appropriate solvent was prepared. Aliquots of this solution were combined with 1 milliliter of an acetone-peanut oil solution in a glass Petri dish and allowed to dry. The aliquots were there to achieve desired toxicant concentration ranging from 100 μg./per Petri dish to that at which 50% mortality was attained. The Petri dishes were placed in a circular cardboard cage, closed on the bottom with cellophane and covered on top with cloth netting. Twenty-five female houseflies, three to five days old, were introduced into the cage and the percent mortality was recorded after 48 hours. The LD–50 values are expressed in terms of μg. per 25 female flies. The result of these insecticidal evaluation tests are given in Table II under "HF."

In the Milkweed Bug (MWB) test, two-week old nymphs of Milkweed Bug (MWB) were placed in separate circular cardboard cages sealed on one end with cellophane and covered by a cloth netting on the other. Aliquots of the toxicants, dissolved in an appropriate solvent, were diluted in water containing 0.002% of a wetting agent, Sponto 221®—(a polyoxyether of alkylated phenols blended with organic sulfonates). Test concentrations ranged from 0.1% downward to that at which 50% mortality was obtained. Each of the aqueous suspensions of the candidate compounds were sprayed onto the insect through the cloth netting by means of a hand-spray gun. Percent mortality in each case recorded after 72 hours, and the LD–50 values expressed as percent of toxicant in the aqueous spray was recorded. These values are reported under the column "MWB" in Table II.

The Lygus Bug (LB) *Lygus hesperus* was tested similarly as the Milkweed Bug, except ten to twenty-five insects were used per cage. The caged insects were sprayed with the candidate compounds at concentrations ranging from 0.05% downward to that at which 50% mortality was obtained. After twenty-four and seventy-two hours, counts were made to determine living and dead insects. The LD–50 (percent) values were calculated. These values are reported under the column "LB" in Table II.

The insect species Black Bean Aphid (BA) *Aphis fabae* (Scop.)—was also employed in the test for insecticidal activity. Young nasturtium (Tropaeolum sp.) plants, approximately 2 to 3 inches tall, were used as the host plants for the bean aphid. The host plant was infested with approximately 50–75 of the aphids. The test chemical was dissolved in acetone, added to water which contained a small amount of Sponto 221®, an emulsifying agent. The solution was applied as a spray to the infested plants. Concentrations ranged from 0.05 percent downward until an LD–50 value was achieved. These results are given in Table II under the column "BA."

ACARICIDAL EVALUATION TEST

The two-spotted mite (2SM), *Tetranychus urticae* (Koch) was employed in tests for miticides. Young pinto bean plants or lima bean plants (Phaseolus sp.) in the primary leaf stage were used as the host plants. The young pinto bean plants were infested with about 100 mites of various ages. Dispersions of candidate materials were prepared by dissolving 0.1 gram in 10 ml. of a suitable solvent, usually acetone. Aliquots of the toxicant solutions were suspended in water containing 0.002% v./v. Sponto 221®, a polyoxyethylene ether sorbitan monolaurate, an emulsifying agent, the amount of water being sufficient to give concentrations of active ingredient ranging from 0.05% to that at which 50% mortality was obtained. The test suspensions were then sprayed on the infested plants to the point of run off. After 7 days, mortalities of the post-embryonic form was determined. The percentage of kill was determined by comparison with control plants which had not been sprayed with candidate compounds. The LD–50 value was calculated using well-known procedures. These values are reported under the column "2SM–PE" in Table II.

SYSTEMIC EVALUATION TEST

This test evalautes the root adsorption and upward translocation of the candidate systemic compound. The two-spotted mite (2SM), *Tetranychus urticae* (Koch) and the Bean Aphid (BA) *Aphis fabae* (Scop.) were employed in the test for systemic activity.

Young pinto bean plants in the primary leaf stage were used as host plants for the two-spotted mite. The pinto bean plants were placed in the bottles containing 200 ml. of the test solution and held in place with cotton plugs. Only the roots were immersed. The test solutions were prepared by dissolving the compounds to be tested in a suitable solvent, usually acetone, and then diluting with distilled water. The final acetone concentration never exceeded about 1 percent. The toxicants were initially tested at a concentration of 10 parts per million (p.p.m.). Immediately after the host plant was placed in the test solution, it was infested with the test species. Mortalities were determined after seven days.

Young nasturtium plants were used as the host plants for the bean aphid. The host plants were transplanted into one pound of soil that had been treated with the candidate compound. Immediately after planting in the treated soil the plants were infested with the aphids. Concentrations of toxicant in the soil ranged from 10 p.p.m. per pound of soil downward until an LD–50 value was obtained. Mortality was recorded after 72 hours.

The precentage of kill of each test species was determined by comparison with control plants placed in distilled water or untreated soil. The LD–50 values were calculated. These systemic test results are reported in Table II under the columns "BA-sys." and "2SM-sys."

It is claimed:

1. A compound having the formula:

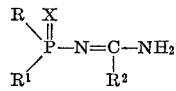

in which R is lower alkyl having 1 to 4 carbon atoms or lower alkoxy having 1 to 4 carbon atoms; $R^1$ is lower alkoxy having 1 to 4 carbon atoms, or lower alkylthio having 1 to 4 carbon atoms; $R^2$ is hydrogen, lower alkyl having 1 to 6 carbon atoms; and X is oxygen when $R^1$ is lower alkylthio and sulfur when $R^1$ is lower alkoxy.

2. The compound of claim 1 in which R is methoxy, $R^1$ is methylthio and $R^2$ is hydrogen.

3. The compound of claim 1 in which R is methoxy, $R^1$ is methylthio and $R^2$ is methyl.

4. The compound of claim 1 in which R is methoxy, $R^1$ is methoxy and $R^2$ is methyl.

5. The compound of claim 1 in which R is methoxy, $R^1$ is methylthio and $R^2$ is n-propyl.

6. The compound of claim 1 in which R is ethyl, $R^1$ is methylthio and $R^2$ is methyl.

7. The compound of claim 1 wherein R is methoxy, $R^1$ is methylthio and $R^2$ is ethyl.

8. The compound of claim 1 wherein R is ethyl, $R^1$ is methylthio and $R^2$ is hydrogen.

9. The compound of claim 1 wherein R is ethyl, $R^1$ is methylthio and $R^2$ is ethyl.

10. The compound of claim 1 wherein R is ethyl, $R^1$ is methylthio and $R^2$ is n-propyl.

TABLE II.—$LD_{50}$ VALUES

| Compound No. | HF, μg. | MWB, percent | LB, percent | BA, percent | BA-sys., p.p.m. | 2 SM-sys. PE, percent | Sys. p.p.m. |
|---|---|---|---|---|---|---|---|
| 1 | 6 | >.1 | .03 | .03 | 3 | .03 | 5 |
| 2 | 15 | >.1 | .01 | .03 | 3 | .03 | >10 |
| 3 | 9 | .1 | .03 | .03 | 8 | .03 | 3 |
| 4 | 8 | >.1 | .03 | .05 | 3 | .03 | 3 |
| 5 | 10 | >.1 | .05 | >.05 | -------- | >.05 | -------- |
| 6 | 50 | .03 | .05 | .03 | 8 | .05 | >10 |
| 7 | 30 | .1 | .005 | .05 | >10 | .05 | 8 |
| 8 | 10 | .1 | .01 | .03 | 3 | .03 | 5 |
| 9 | 30 | >.1 | .05 | .03 | 8 | >.05 | 8 |
| 10 | 30 | .05 | .003 | .03 | 3 | .03 | 10 |
| 11 | 5 | .008 | .01 | .008 | 8 | >.05 | -------- |
| 12 | >100 | >.1 | .03 | >.05 | -------- | >.05 | -------- |
| 13 | >100 | >.1 | >.05 | .05 | 10 | >.05 | -------- |
| 14 | 3 | .1 | >.05 | .008 | 3 | .03 | 3 |
| 15 | 25 | >.1 | .05 | .03 | 5 | >.05 | -------- |

As those in the art are well aware, various techniques are available for incorporating the active component or toxicant in suitable pesticidal compositions. Thus, the pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous medium and such compositions may be produced by forming a concentrated solution of the toxicant in a suitable organic solvent followed by dispersion in water, usually with the aid of surface-active agents. The latter, which may be anionic, cationic or nonionic types, are exemplified by sodium stearate, potassium oleate, and other alkaline metal soaps and detergents such as sodium lauryl sulfate, sodium naphthalene sulfonate, sodium alkyl naphthalane sulfonate, methyl cellulose, fatty alcohol ethers, polyglycol fatty acid esters and other polyoxyethylene surface-active agents. The proportion of these agents commonly comprises 1–15% by weight of the pesticidal compositions although the proportion is not critical and may be varied to suit any particular situation.

11. A compound having the formula:

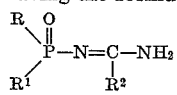

in which R is lower alkyl having 1 to 4 carbon atoms or lower alkoxy having 1 to 4 carbon atoms; $R^1$ is lower alkylthio having 1 to 4 carbon atoms; and $R^2$ is hydrogen, lower alkyl having 1 to 6 carbon atoms.

12. A compound having the formula:

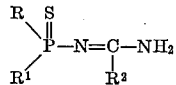

in which R is lower alkyl having 1 to 4 carbon atoms or lower alkoxy having 1 to 4 carbon atoms; $R^1$ is lower alkoxy having 1 to 4 carbon atoms; and $R^2$ is hydrogen, lower alkyl having 1 to 6 carbon atoms.

References Cited

UNITED STATES PATENTS 3,281,321  10/1966  Malz et al. _____ 260—944 X

FOREIGN PATENTS 151,685  11/1962  U.S.S.R. _____ 260—944

LEWIS GOTTS, Primary Examiner

A. H. SUTTO, Assistant Examiner

U.S. Cl. X.R.

260—984, 989; 424—210

UNITED STATES PATENT OFFICE
CERTIFICATE OF CORRECTION

Patent No. 3,734,980          Dated May 22, 1973

Inventor(s) Ferenc M. Pallos

It is certified that error appears in the above-identified patent and that said Letters Patent are hereby corrected as shown below:

Column 2, line 50, 2nd formula -

"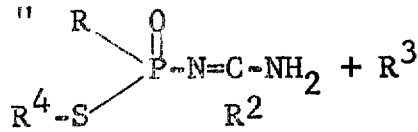"

should read

---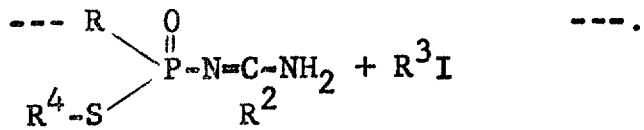---.

Column 5, lines 73 and 74, "presticidal compositions" should read ---pesticidal compositions---.

Signed and sealed this 22nd day of January 1974.

(SEAL)
Attest:

EDWARD M. FLETCHER, JR.          RENE D. TEGTMEYER
Attesting Officer                Acting Commissioner of Patents